Figure 1:
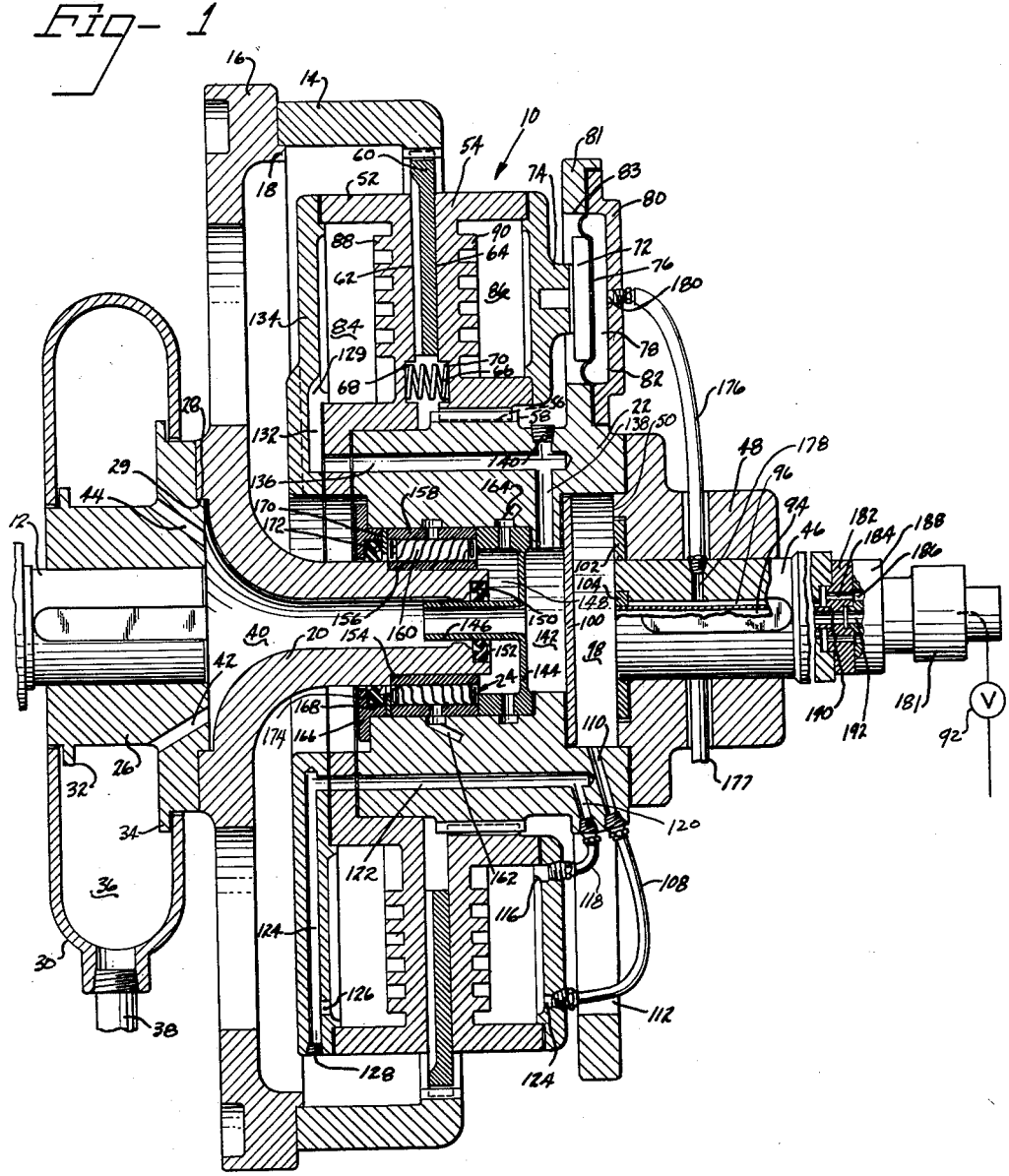

Nov. 6, 1962   L. HORNBOSTEL   3,062,347
COOLED CLUTCH
Filed Aug. 3, 1959

INVENTOR
LLOYD HORNBOSTEL

BY

ATTORNEYS

United States Patent Office 3,062,347
Patented Nov. 6, 1962

3,062,347
COOLED CLUTCH
Lloyd Hornbostel, Beloit, Wis., assignor to Beloit Iron Works, Beloit, Wis., a corporation of Wisconsin
Filed Aug. 3, 1959, Ser. No. 831,139
4 Claims. (Cl. 192—113)

This invention relates to a clutch drive for heavy machinery and more particularly to an air actuated and liquid cooled clutch drive for starting sections of machines such as paper making machines and other machines having heavy driven sections which can only be brought up to operating speeds after their large inertia has been overcome.

Clutches for heavy duty machinery such as paper machine driers and calendar sections have continually increased in size because of the need for providing sufficient surface for the dissipation of heat to atmosphere. One result of this development has been occasional damage to the output shaft resulting from the greater torque capacity of such large diameter clutches. Another result has been that effective cooling of the clutch members has become increasingly difficult, particularly since such clutches require that both members rotate and that the operating friction members also have relative axial movement so that liquid cooling has been relatively impractical. Thus, in some cases the entire clutch has been enclosed and the cooling has been provided by circulating lubricating oil in the enclosure. However, because of the wear on friction members this usually has resulted in excessive contamination of the lubricant, and a reduction in the capacity of the friction members due to the lubrication of the friction members. Likewise, although numerous expedients have been developed for moving air around or through the friction members for cooling purposes, these have not been satisfactory because the heat capacity of air is considerably less than that of most liquids.

The present invention overcomes these difficulties by providing a water-cooled, air actuated dry plate clutch utilizing a combination of a plurality of diaphragms and flexible conduit connections delivering cooling water into the interior of the friction plates so as to carry away heat generated during the slipping period of the plates. The diaphragms are responsive to air pressure to move one of the friction plates slidably along a hub member fixed to the driven shaft and into engagement with a driving friction member and a friction plate fixed to the hub to engage the clutch. The flexible conduits introduce liquid carried through the driven shaft to a connection in the slidable friction plate which is angularly spaced from contact members thereon for engaging the plurality of air actuated diaphragms.

In order to cool the clutch, each of the friction plates defines an annular chamber therein, and liquid from the flexible conduits is circulated therethrough. To assist in conducting heat to the liquid, annular, radially spaced cooling fins are formed in the chambers. Liquid is introduced at the larger diameter of the slidable friction plate and is removed at a relatively smaller diameter portion thereof, thereby utilizing the change in density as the liquid is heated, to assist in circulating the liquid. Further flexible conduit means communicate the liquid from the chamber in the slidable friction plate to a passage in the hub section leading to a passage in the other friction plate, and thence into an annular cooling chamber in the other friction plate through a connection at a larger diameter portion thereof. The liquid is removed from the annular chamber in this friction plate at the radially inner portion of the chamber, and preferably at a point opposite the point of its introduction, and thereupon passes through the hub and through a central fitting within the hub which is journalled in the drive shaft. Thereupon the liquid is passed through a hollow, flared portion of the drive shaft and through angularly aligned passages in a fitting secured thereto, into a collector ring structure which receives the drive shaft therethrough in journalled relationship. Suitable outlet conduit means are connected to the collector ring to lead the heated liquid from the clutch.

The air for actuating the diaphragm means is passed coaxially along the driven shaft around a central passage introducing the fluid to the clutch plates and thereupon through fixed conduit means to a chamber formed in a flange fixedly secured to the hub and having diaphragms for actuating the slidable friction plate secured thereto so as to form a wall of the chamber.

The drive shaft may be used as the driven shaft and the driven shaft as the drive shaft within the compass of the invention.

Accordingly, it is an object of the present invention to provide an effective liquid cooled clutch for heavy duty machinery.

Another object of the invention is to provide a liquid cooled clutch having air-actuated dry plate clutch means to prevent slipping during full engagement of the clutch.

Another object of the invention is to provide liquid cooled clutch means as described wherein the clutch plates define cooling chambers interiorly thereof so that thorough cooling is afforded without cumbersome external container means for the fluid.

Another object of the invention is to provide a liquid cooled clutch plate structure as described wherein the flow of fluid is assisted by introducing the fluid at the large diameter portions of the clutch plates so that the change in density of the fluid as it is heated assists in moving it to the interior of the chambers in the clutch plates and assists the flow of the fluid through the clutch.

Another object of the invention is to provide annular flanges in the clutch plate chambers which dissipate heat into the fluid within the chambers.

Another object of the invention is to provide relatively axially movable clutch plates which are cooled internally by fluid introduced into a moving clutch plate by flexible conduit means.

Other objects and advantages of the invention will become apparent as the description proceeds in accordance with the drawings in which:

FIGURE 1 is a vertical sectional view of a clutch according to the present invention.

Referring now to the drawings, a clutch 10 is shown according to the present invention which is effective to drive heavy duty machinery such as paper machine driers, calendar sections and the like. The clutch 10 has an input or drive shaft 12 driven by suitable means (not shown) in accordance with the understanding of those skilled in the art, and which is effective to rotate an annular flange member 14 secured to a spider or the like 16. The spider 16 has a shoulder 18 for engaging the flange 14, and is integral with a flared drive fitting 20. The fitting 20 is of tubular construction and is journalled in a hub section 22 by bearing means 24, as hereinafter described. Driving force is imparted to the fitting 20 through a second fitting 26 to which fitting 20 is press fitted or otherwise secured, as by annular shoulders 28 and 29, and the fitting 20 is secured to the drive 12 by splining or the like (not shown). A collector ring 30 receives the fitting 26 therein in close but not tactual relationship, with the fitting 26 defining radial flanges 32 and 34 for this purpose. Thus the collector ring 30 provides a collector chamber 36 in cooperation with the fitting 26, and affords a means for passing fluid to an outlet conduit 38 from the outwardly flared passage 40 in the tubular fitting 20 and angularly aligned passages such as 42 and 44 in the fitting 26, as hereinafter described.

For transmitting driving force to the driven shaft 46, the hub member 22 is press fitted or otherwise secured to a fitting 48 having a shoulder 50, and which in turn is press fitted or keyed to the output shaft or driven shaft 46. The hub 22 carries a friction plate 52 fixedly secured thereto and a friction plate 54 slidably secured thereto, as by splines 56 and 58. The annular drive flange 14 has splined thereto a friction member 60 which is disposed between the faces 62 and 64 of the friction plates 52 and 54, and the plates 52 and 54 are normally urged apart by spring members 66 disposed in suitable recesses 68 and 70 in the plates 52 and 54.

The slidable plate 54 carries a plurality of pressure shoes 72 which may be threaded within bosses 74 and in order to control engagement of the friction faces 62 and 64 with the friction member ring 60, a plurality of diaphragms 76 exert controlled force against the shoes 72 by means of air introduced into pressure chambers 78 which are formed cooperatively with the diaphragms 76 by a plate 80 mounted in an annular flange 81 of hub 22. Thus the plate 80 defines a plurality of recesses 82 which are disposed in register with shoe-receiving openings 83 in the flange 81.

In order to cool the plates 52 and 54 without introducing lubricant between the surfaces 62 and 64 and friction member 60, and so as to provide a dry type of friction clutch, each of the plates 52 and 54 defines therein an annular chamber, indicated at 84 and 86 respectively. The friction plates 52 and 54 further define a plurality of annular, axially extending flanges or cooling fins as indicated at 88 and 90, respectively, which extend inwardly into the chambers 84 and 86 from the faces 62 and 64 to dissipate heat generated during the slipping period of the clutch.

Fluid is circulated through the said chambers 84 and 86 from a source of supply (not shown) controlled by a valve 92 which may be of a type adapted to permit the supply of fluid to be shut off when the clutch is in an inoperative condition or when the plates are locked and not slipping. The fluid passes through the shaft 46 by means of a conduit 94 which is coaxially located within an air passage 96 as hereinafter further described. It then enters a cylindrical chamber 98 defined by the fitting 48, the hub 22 and a partition 100, the fitting 48 being preferably provided with sealing members 102 and 104.

In accordance with the invention, flexible conduit means are provided which communicate fluid from the chamber 98 to the friction plate chambers 84 and 86, whereby to accommodate relative axial movement of the plates 52 and 54 without disrupting the fluid flow. These means include a flexible conduit 108 communicating with the chamber 98 through a passage 110 in the hub 22 and passing through an opening 112 in the radial flange structure 81 of the hub 22 interposed between the diaphragms 78.

The conduit 108 enters the annular chamber 86 through a suitable port 124, which desirably is disposed at a location on the plate 54 which is of relatively great diameter with respect to the maximum diameter of the plate. The fluid entering the chamber 86 is relatively cool and due to its relatively greater density at such time, it tends not to move inwardly radially as it circulates through the chamber 86 until it receives heat from the friction surface 64 and the fins 90. Thus an outlet port 116 is formed at a radially inner portion of the chamber 86 i.e., a location of relatively reduced diameter in the plate 54. It is taken from the chamber 86 by a flexible conduit 118, to an inlet port 120 in the hub 22, from which it is introduced into an axially extending bore or passage 122 in the hub 22. The passage 122 connects with a radially extending passage 124 in the plate 52 and is introduced from passage 124 into the chamber 84 in plate 52 through a port 126, the passage 124 being closed by a suitable plug 128.

It will be noted that the port 126, like the port 114, is at the radially outer portion of the chamber 84, which corresponds to a relatively larger diameter portion of the plate 52. The fluid again tends to move inwardly within the chamber 84 as it circulates past the annular cooling flanges or heat dissipating fins 88 therein, and is preferably taken from the chamber 84 through a port 129 formed at a radially inner portion of the chamber 84, i.e., at a portion of relatively reduced diameter with respect to the overall diameter of the plate 22. The heated fluid then passes through an outlet passage 132 in the rear wall 134 of the plate 52 and axially along the hub 22 through a passage 136 formed therein. A bore 138 formed radially in the hub 22, and plugged at 140, introduces the fluid into a central, circular outlet chamber 142 separated from the inlet chamber 98 by the partition 100. The chamber 142 is formed by the partition 100, the hub 22 and the annular wall of a fitting 144 which is press-fitted or otherwise secured within the hub 22.

The fluid passes from the chamber 142 through a tube 146 formed integrally with the fitting 142, and into the flared passageway 40 within the fitting 20, by means of which it is introduced into the collecting chamber 36 through the passages 42 and 44, as previously described, for removal to the outlet conduit 38.

The fitting 144 may define a chamber 148 receiving the end of the tubular fitting 20, which is recessed to receive an annular retainer 150 for a flexible, resilient seal 152 affording relative rotation of the fitting 144 and the fitting 20 and preventing mixing of lubricant with the fluid passing from the tube 146 into the passage 40. The fitting 20 also defines a recessed portion 154 for the inner race 156 of the bearing means 24, the outer race 158 being disposed in the hub 22. A suitable bearing structure is provided within the bearing races 152 and 156 as indicated at 160, and lubricant is introduced thereto through a lubricant drilling 162 communicating with the chamber 148 through the bearing 24 and passing therefrom through a suitable vent drilling 164. The other side of the bearing 24 is sealed by means of an annular flange 166 in the fitting 22 and defining an axial flange 168 separated by a washer 170 from the bearing, a resilient seal 172 being received within a retainer 174 seated in the flange 166.

Air for actuating the diaphragms 76 is introduced through the annular passage 96 extending along the shaft 46 and conduits 176 and 177, which may be of relatively rigid construction, communicate the air from passage 96 through a radial bore 178 in the shaft 46 and ports 180 in the plate 80 to the pressure chambers 78.

Both the water entering the passage 94 and the air entering passage 96 are communicated to a rotary shaft seal, dual passage structure 181, in accordance with the understanding of those skilled in the art. The passage 96 may communicate with a fitting 182 defining a passage 184 which is continuous with a passage 186 in an adjacent portion 188 of the fitting 182. Likewise, the passage 94 may be continuous with a passage portion 190 in the fitting 182 and with a passage 192 in the portion 188 whereby the continuity with the roto-seal structure 181 is maintained. The air may be selectively controlled to provide pressure at a relatively low level in chambers 78 during the slipping period for the plates 52 and 54, whereby the machinery may be gradually energized and brought up to the proper speed without imposing an undue burden on the clutch. Thereafter, the pressure may be increased to prevent slippage between the plates 52 and 54, and at such time the control valve 92 for the fluid may be shut off. However, fluid may be introduced into the chambers 84 and 86 both during and after the slipping period for the clutch within the concept of the invention.

There has thus been provided a clutch for use with heavy duty machinery which may be operated by dry clutch plate means with a high degree of efficiency.

Liquid is introduced into the interior of the clutch plates without interference with relative axial movement of the plates by means of flexible conduits so that an unusually effective cooling action is obtained, which in turn reduces the size requirements for the clutch. The clutch may be operated over long periods of time and without interference with the operating characteristics of the clutch plates such as occurred as a result of contamination of the lubricant where enclosed hydraulic lubrication was used. Furthermore, the effectiveness of the cooling action is maximized as a result of the difference in heat capacity of water or other liquids as compared with air.

Although the clutch has herein been described as being driven from the shaft 12, power could also be applied through the shaft 46 and with shaft 12 acting as the driven member.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A clutch comprising a rotatable drive shaft, a rotatable driven shaft, one of said shafts carrying a friction member and the other of said shafts fixedly carrying a hub, said one of said shafts being journalled in said hub, a friction plate fixedly mounted on said hub, a friction plate slidably mounted on said hub, said friction member mounted on said one of said shafts being disposed between said friction plates, pneumatic means for effecting engagement of said friction plates, a cooling chamber inside each of said friction plates in sealed relation to the outside of said friction plates, flexible conduit means leading from a source of liquid supply to the chamber in said slidable friction plate, flexible conduit means leading from the chamber in said slidable friction plate, conduit means leading through said hub to the other chamber and connected to the flexible conduit means leading from said chamber in said slidable friction plate, conduit means leading from said other chamber to the interior of said hub and conduit means leading through said one of said shafts from the interior of said hub to an outlet.

2. A clutch comprising a rotatable drive shaft, a rotatable driven shaft, one of said shafts fixedly carrying a friction member and the other of said shafts fixedly carrying a hub, said one of said shafts being journalled in said hub, a friction plate fixedly mounted on said hub, a friction plate slidably mounted on said hub, said friction member mounted on said one of shafts being disposed between said friction plates, pneumatic means for effecting engagement of said friction plates, a cooling chamber inside each of said friction plates in sealed relation to the outside of said friction plates, flexible liquid conduit means leading from a source of liquid supply to the chamber in said slidable friction plate, flexible liquid conduit means leading from the chamber in said slidable friction plate, liquid conduit means leading through said hub to the other chamber and connected with the flexible liquid conduit means leading from said chamber in said slidable friction plate, liquid conduit means leading from said other chamber to the interior of said hub and liquid conduit means leading through said one of said shafts from the interior of said hub to an outlet, said hub having a tubular element therein extending in journalled relation into the conduit means in said one of said shafts, said one of said shafts having sealing means for said tubular element.

3. A clutch comprising a rotatable drive shaft, a rotatable driven shaft, one of said shafts fixedly carrying a friction member and the other of said shafts fixedly carrying a hub, said one of said shafts being journalled in said sub, a friction plate fixedly mounted on said hub, a friction plate slidably mounted on said hub, said friction member mounted on said one of said shafts being disposed between said friction plates, pneumatic means for effecting engagement of said friction plates, a cooling chamber inside each of said friction plates in sealed relationship to said friction plates, liquid conduit means in said other of said shafts, flexible liquid conduit means leading from said liquid conduit means in said other of said shafts to the chamber in said slidable friction plate, flexible liquid conduit means leading from the chamber in said slidable friction plate, conduit means leading through said hub to the other chamber and connected to the flexible liquid conduit means leading from said chamber in said slidable friction plate, liquid conduit means leading from said other chamber to the interior of said hub and liquid conduit means leading through said one of said shafts from the interior of said hub to an outlet.

4. A clutch comprising a rotatable drive shaft,
a rotatable driven shaft,
a friction member mounted on one of said shafts,
a pair of friction plates mounted on the other of said shafts with said friction member disposed therebetween,
one of said friction plates being axially movable with respect to the other of the friction plates, means for selectively engaging said friction plates with said friction means,
each of said friction plates having a cooling chamber therein,
and means for circulating liquid coolant through said chambers including conduit means for liquid in said other of said shafts,
a flexible conduit leading from said conduit means to the chamber of one of said friction plates, a flexible conduit leading from the chamber in said one of said plates,
conduit means leading from the flexible conduit leading from said chamber in said one of said plates to the chamber in the other of the plates,
and conduit means leading from the chamber in the other of the plates to said one of said shafts,
said one of said shafts having liquid outlet means formed therein.

References Cited in the file of this patent

UNITED STATES PATENTS

| 1,956,188 | Black | Apr. 24, 1934 |
| 2,622,714 | Cardwell et al. | Dec. 23, 1952 |
| 2,664,176 | Whalen | Dec. 29, 1953 |
| 2,778,451 | Friedman | Jan. 22, 1957 |
| 2,821,271 | Sanford | Jan. 28, 1958 |
| 2,915,146 | Lee et al. | Dec. 1, 1959 |

FOREIGN PATENTS

| 272,666 | Great Britain | June 23, 1927 |
| 579,061 | Germany | June 21, 1933 |
| 778,336 | Great Britain | July 3, 1957 |